United States Patent [19]

Nishikawa et al.

[11] Patent Number: 5,686,801
[45] Date of Patent: Nov. 11, 1997

[54] CATHODE CURRENT DETECTING METHOD AND DETECTING CIRCUIT CAPABLE OF CORRECTLY DETECTING CATHODE CURRENT BY CLAMPING LEAK CURRENT AT 0 V

[75] Inventors: Katsuhiko Nishikawa; Hiroya Ikeda, both of Aichi, Japan

[73] Assignee: Sony Corporation, Tokyo, Japan

[21] Appl. No.: 528,430

[22] Filed: Sep. 14, 1995

[30] Foreign Application Priority Data

Sep. 20, 1994 [JP] Japan .................................. 6-224587

[51] Int. Cl.$^6$ .................................................. H01J 29/52
[52] U.S. Cl. ............................ 315/383; 348/655; 348/695
[58] Field of Search .......................... 315/383; 348/380, 348/655, 656, 695

[56] References Cited

U.S. PATENT DOCUMENTS

| | | | |
|---|---|---|---|
| 4,694,350 | 9/1987 | Hinn . | |
| 5,339,011 | 8/1994 | Tamura et al. | 315/383 |
| 5,400,086 | 3/1995 | Sano et al. | 348/678 |
| 5,589,883 | 12/1996 | Ogino et al. | 348/379 |

*Primary Examiner*—Theodore M. Blum
*Attorney, Agent, or Firm*—Jay H. Maioli

[57] ABSTRACT

A cathode current detecting method wherein both a highlight detection pulse used to detect a white component and a cutoff detection pulse used to detect a black component are input to a signal input unit, and a cathode current flowing through a cathode is detected which corresponds to one of the highlight detection pulse and the cutoff detection pulse, includes the steps of: outputting a leak current detection pulse having the same magnitude as that of the cutoff detection pulse at a preselected timing; prohibiting an electron beam emitted from the cathode from flowing through an anode at the preselected timing; and detecting the leak current flowing through the cathode in response to the leak current detection pulse at the preselected timing to clamp a voltage corresponding to the leak current to a predetermined reference potential. A cathode current detecting circuit is provided wherein both a highlight detection pulse used to detect a white component and a cutoff detection pulse used to detect a black component are inputted to a signal input unit, and a cathode current corresponding to an electron beam flowing from a cathode to an anode based upon one of the highlight detection pulse and the cutoff detection pulse, of: includes a signal output circuit for outputting a leak current detection pulse having the same magnitude pulse as that of the cutoff detection pulse at a preselected timing; A current for prohibiting the electron beam emitted from the cathode from flowing at the preselected timing; a prohibit signal circuit for outputting a signal used to cause the prohibiting circuit to perform a prohibit operation in response to the output from the signal output circuit at the preselected timing; and a clamping circuit for detecting a leak current flowing through the cathode in response to the leak current detection pulse at the preselected timing to clamp a voltage corresponding to the leak current to a predetermined reference potential.

6 Claims, 5 Drawing Sheets

Fig.2
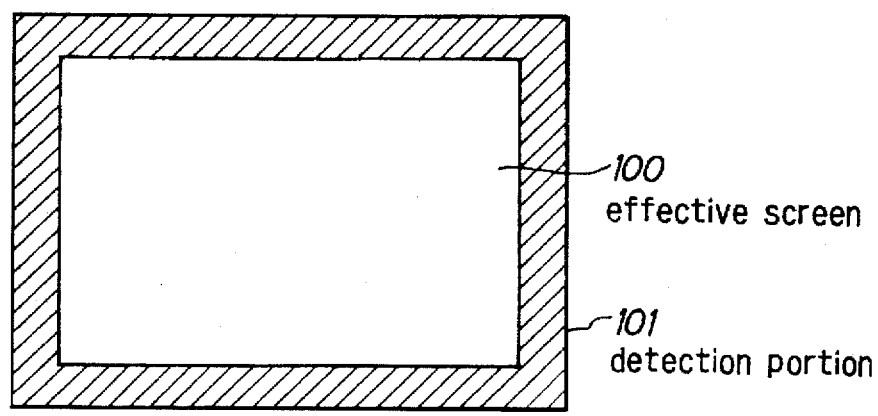
Fig.3A
PRIOR ART
Fig.3B
PRIOR ART
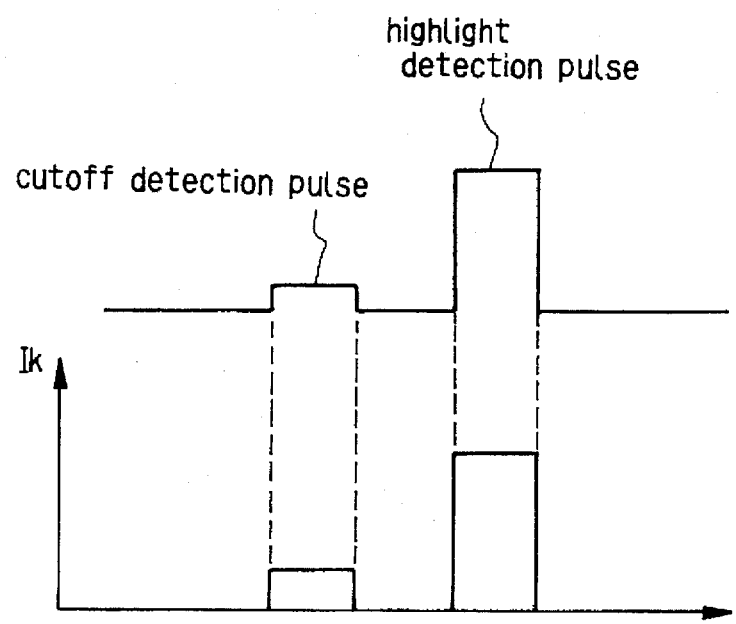

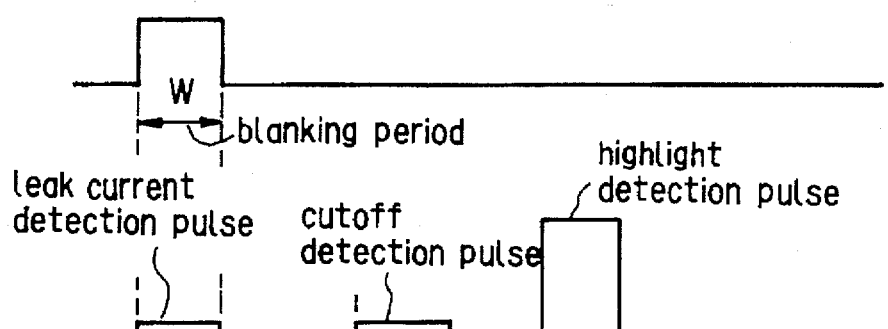
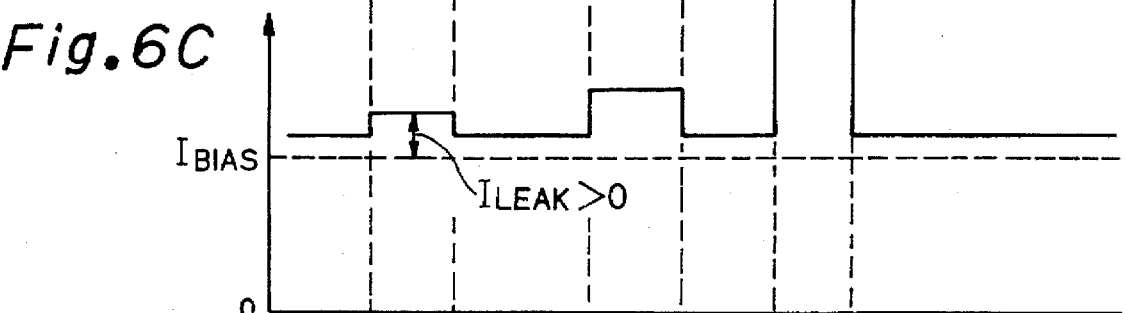
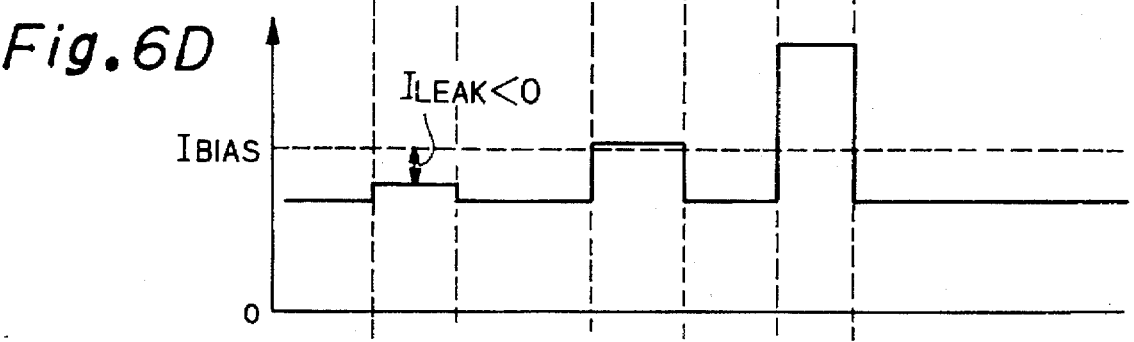
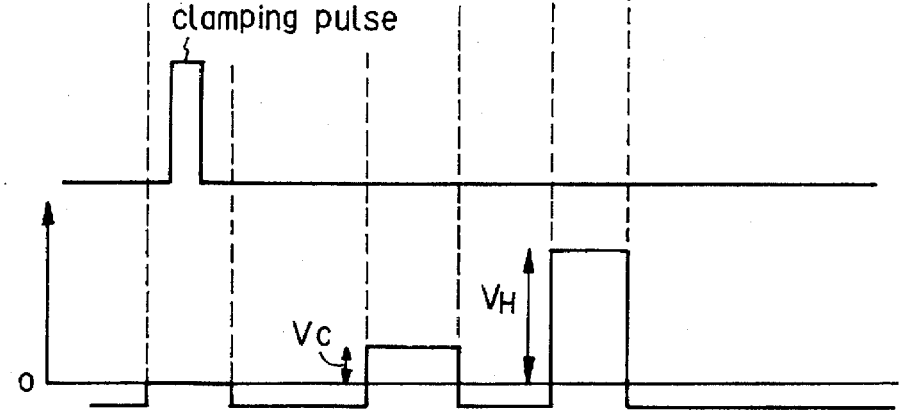

CATHODE CURRENT DETECTING METHOD AND DETECTING CIRCUIT CAPABLE OF CORRECTLY DETECTING CATHODE CURRENT BY CLAMPING LEAK CURRENT AT 0 V

BACKGROUND OF THE INVENTION

1. Field of the Invention

The present invention generally relates to a cathode current detecting method and a detecting circuit thereof for, e.g., a cathode current of a CRT (cathode-ray tube). More specifically, the present invention is directed to such a cathode current detecting method/detecting circuit suitable to detect a cathode current employed when a white balance of a CRT is controlled.

2. Description of the Related Art

A color CRT generally contains three electron guns of red (R), green (G) and blue (B), which are mutually independently provided. When adjustments of the respective three electron guns are carried out under misalignment conditions, the current ratios among these electron guns would be changed, so that a specific color would become dark, or deep, whereas a complementary color thereof would become light, or pale. As a consequence, a colored image could not be correctly reproduced.

To solve the above-described problem, a so-called "white balance control" is conventionally carried out. The white balance control implies that fluorescent balances in R, G, B are controlled so as to obtain a correct black/white image.

In the beam current feedback type white balance control circuit, for instance, the cathode currents flowing through the respective three electron guns are detected, and the luminance control is carried out based on the detected cathode currents, so that the R, G, B fluorescent balances are controlled.

FIG. 1 shows an example of the circuit arrangement of the conventional cathode current detecting circuit. A cathode-ray tube 1 is so arranged, as viewed from the left side of this drawing, by a cathode 2 for emitting an electron beam, a heater 3 for heating the cathode 2, grids 4 and 5 for controlling the electron beam emitted by the cathode, an anode 6 through which the electron beam emitted by the cathode 2 flows, and a screen 7 on which the electron beam controlled by the grids 4 and 5 impinges.

A signal output circuit 15 applies a signal on which a picture (video) signal and two kinds of detection pulses have been superimposed to a base of a PNP transistor 12. An emitter of the PNP transistor 12 is connected to the cathode 2. A collector of this PNP transistor 12 is grounded via a resistor 13. A buffer 14 outputs a voltage corresponding to a value of a current flowing through the resistor 13 to an external circuit.

An effective screen 100 indicated in FIG. 2 corresponds to a region which can be observed by a viewer within the display screen 7 of the CRT 1. A detection portion 101 existing outside the effective screen 100 corresponds to a region which is not displayed on the display screen of the screen 7.

Either a cutoff detection pulse, or a highlight detection pulse, as shown in FIG. 3a, is applied from the signal output circuit 15 to the base of the PNP transistor 12 at a timing under which the detection unit 101 is scanned by the scanning line. A cutoff detection pulse is a pulse used to detect a cathode current $I_k$ flowing through the cathode 2 when the electron beam is illuminated from the cathode 2 to a position within the display screen, which is displayed in black. A highlight detection pulse is a pulse used to detect the cathode current $I_k$ when the electron beam is emitted from the cathode 2 to a position within the display screen, which is displayed in white.

When the detection pulses are applied in this manner, the cathode currents corresponding to the respective detection pulses may flow. To detect the current values at this time, the voltages appearing at the resistor 13 shown are detected, and then the cathode detection voltages are outputted from the buffer 14. FIG. 3B represents levels of the currents flowing through the cathode 2 corresponding to the respective pulses.

However, there are some possibilities that the above-described cathode current $I_k$ contains not only the cathode current originally detected, but also the leak current component derived from the heater 3 and the cathodes for producing other color beams. There is a problem when the current flowing through the cathode is detected as the cathode current while the current value of this leak current is varied in accordance with an elapse of time, and this detected cathode current is used to control the white balance. That is, by doing so, the normal luminance can be hardly maintained so as to stabilize the white balance.

On the other hand, a so-termed "automatic color temperature control circuit" is disclosed in Japanese laid-open patent application No, Sho-42-72289 opened on Apr. 2, 1987. In this automatic color temperature control circuit, the clamping circuit is employed to clamp the cathode current detection signal during the vertical blanking period, and the comparator compares the reference voltage with the cathode current detection signal within the reference pulse interval immediately after the vertical blanking period, which is supplied via the clamping circuit, to obtain a difference voltage. Then, the levels of the primary color signals are controlled based on this difference voltage to cancel the leak current, so that the color temperature can be automatically controlled.

However, according to this conventional automatic color temperature control circuit, no detection can be made of components of the leak current flowing from one cathode in question employed within the CRT into other electrodes (mainly, other cathodes and heater electrodes) under the same condition when the cathode current is detected.

SUMMARY OF THE INVENTION

The present invention has been made to solve the above-described problems, and therefore, has an object to provide a cathode current detecting method/circuit capable of correctly detecting a cathode current of a CRT.

A cathode current detecting circuit having a cathode current detecting circuit wherein both of a highlight detection pulse used to detect a white component and a cutoff detection pulse used to detect a black component are inputted to a signal input unit (for instance, PNP transistor 12), and a cathode current corresponding to an electron beam flowing from a cathode (for example, cathode 2) to an anode (example, anode 6 of FIG. 4) based upon one of said highlight detection pulse and said cutoff detection pulse, includes signal outputting means (e.g., signal outputting circuit 15 of FIG. 4) for outputting a leak current detection pulse having the same magnitude pulse as that of said cutoff detection pulse at a preselected timing;

prohibiting means (e.g., grids 4 and 5 of FIG. 4) for prohibiting the electron beam emitted from said cathode from flowing at said preselected timing;

prohibit signal outputting means (e.g., control pulse generating circuit 30 of FIG. 4) for outputting a signal used to cause said prohibiting means to perform a prohibit operation in response to the output from said signal outputting means at said preselected timing; and clamping means (e.g., clamping circuit 2 of FIG. 4) for detecting a leak current flowing through said cathode in response to said leak current detection pulse at said preselected timing to clamp a voltage corresponding to said leak current to a predetermined reference potential.

The above-described preselected timing corresponds to a period during which said electron beam is scanned outside of an effective display screen.

A cathode current detecting method as recited in claim 1 provides a cathode current detecting method wherein both of a highlight detection pulse used to detect a white component and a cutoff detection pulse used to detect a black component are inputted to a signal input unit (e.g., PNP transistor 12 of FIG. 1), and a cathode current flowing through a cathode (e.g., cathode 2 of FIG. 1) is detected which corresponds to one of said highlight detection pulse and said cutoff detection pulse, that includes the steps of:

outputting a leak current detection pulse having the same magnitude as that of said cutoff detection pulse at a preselected timing;

prohibiting an electron beam emitted from said cathode from flowing through an anode at said preselected timing; and detecting the leak current flowing through said cathode in response to said leak current detection pulse at said preselected timing to clamp a voltage corresponding to said leak current to a predetermined reference potential.

In the cathode current detecting circuit and cathode current detecting method with the above-described arrangements, the leak current flowing through the cathode is detected at a preselected timing, and this detected leak current is clamped to 0 V. As a consequence, the cathode current can be correctly detected.

BRIEF DESCRIPTION OF THE DRAWINGS

For a better understanding of the present invention, reference is made of the detailed description to be read in conjunction with the accompanying drawings, in which:

FIG. 2 schematically represents the display screen area of the CRT1;

FIG. 3A and 3B show a timing chart for explaining the operations of the conventional cathode current detecting circuit;

FIGS. 6A–6F show a timing chart for explaining operations of the cathode current detecting circuit of FIG. 4.

DETAILED DESCRIPTION OF THE PREFERRED EMBODIMENTS

Figure 1:
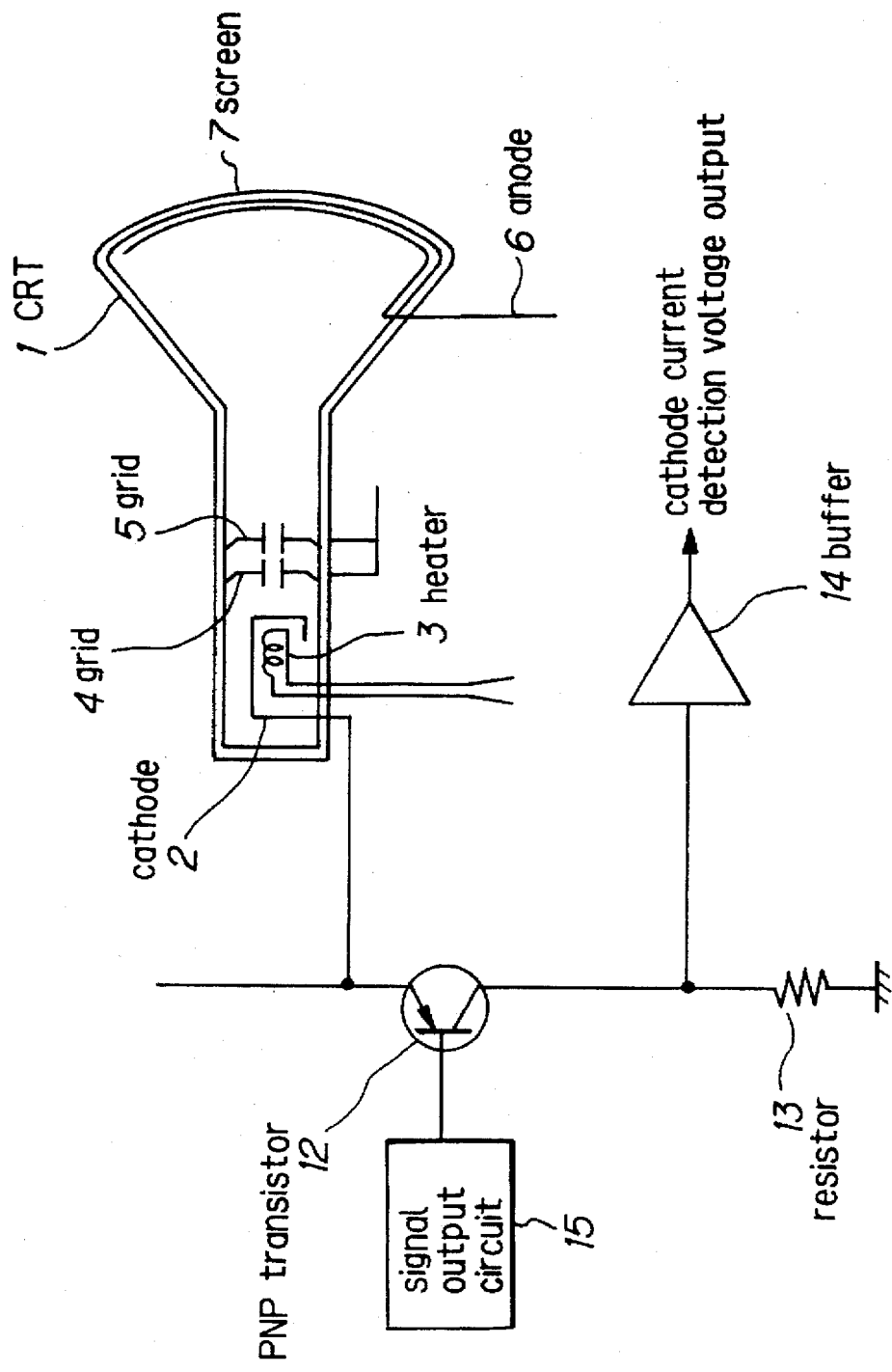
FIG. 1 schematically shows the arrangement of the conventional cathode current detecting circuit.

Referring now to the drawings, a cathode current detecting circuit according to an embodiment of the present invention will be described.

Figure 4:
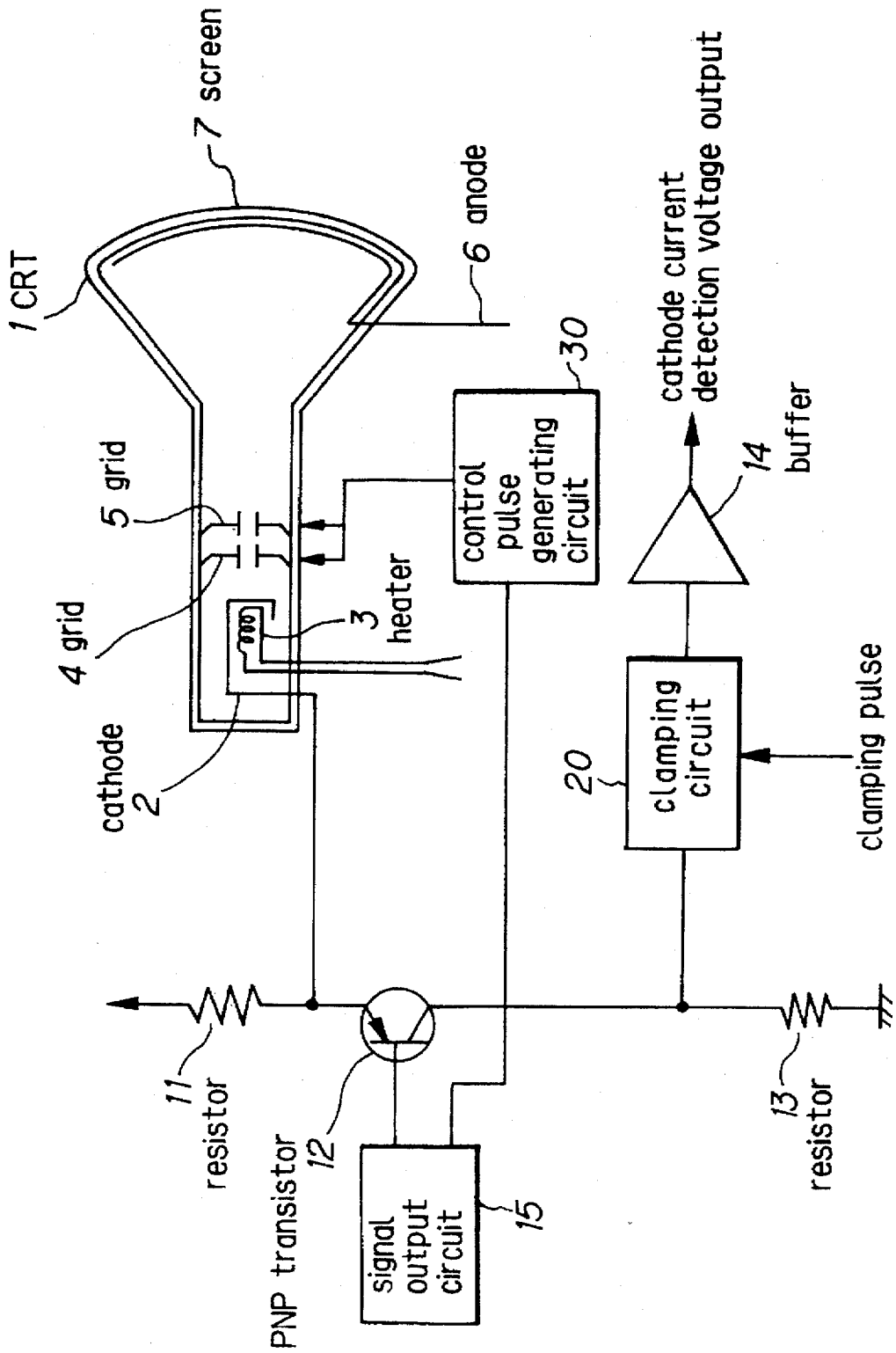
FIG. 4 is a circuit diagram for schematically indicating an arrangement of a cathode current detecting circuit according to an embodiment of the present invention.

FIG. 4 is a circuit arrangement of a cathode current detecting circuit according to an embodiment of the present invention. It should be noted that the same reference numerals shown in FIG. 1 will be employed as those for denoting the same or similar circuit elements shown in FIG. 4, since the circuit arrangement of the cathode current detecting circuit according to the embodiment is similar to that of the conventional cathode current detecting circuit. Under such a condition that the cathode 2 is heated by the heater 3, when an input signal is supplied from a signal input circuit 15 to a base of a PNP transistor 12, an electron beam is emitted from this cathode 2. Both a grid 4 and another grid 5 are designed to control the electron beam emitted from the cathode 2 and that is attracted to a screen 7.

A signal output circuit 15 supplies a signal on which a picture (video) signal and three kind of detection pulses (that will be discussed later) have been superimposed to the base of the PNP transistor 12. An emitter of this PNP transistor 12 is connected to the cathode 2, and also via a resistor 11 to a predetermined voltage source. A collector of this PNP transistor 12 is grounded via another resistor 13.

A clamping circuit 20 is arranged between the resistor 13 and a buffer 14. The buffer 14 receives an output from the clamping circuit 20 and outputs a clamped voltage to an outside circuit.

A control pulse generating circuit 30 generates a control pulse having a predetermined level in synchronism with the output from the signal output circuit 15, and supplies the control pulse to either the grid 4 or the grid 5 so as to prohibit the electron beam emitted from the cathode 2 from flowing through the anode 6.

It should also be noted that although there is shown only one set of cathode 2, heater 3, PNP transistor 12, resistors 11,13, buffer 14, clamping circuit 20, and control pulse generating circuit 30 in FIG. 4, three sets of these components are actually required since the CRT is constructed of the three electron guns.

Figure 5:
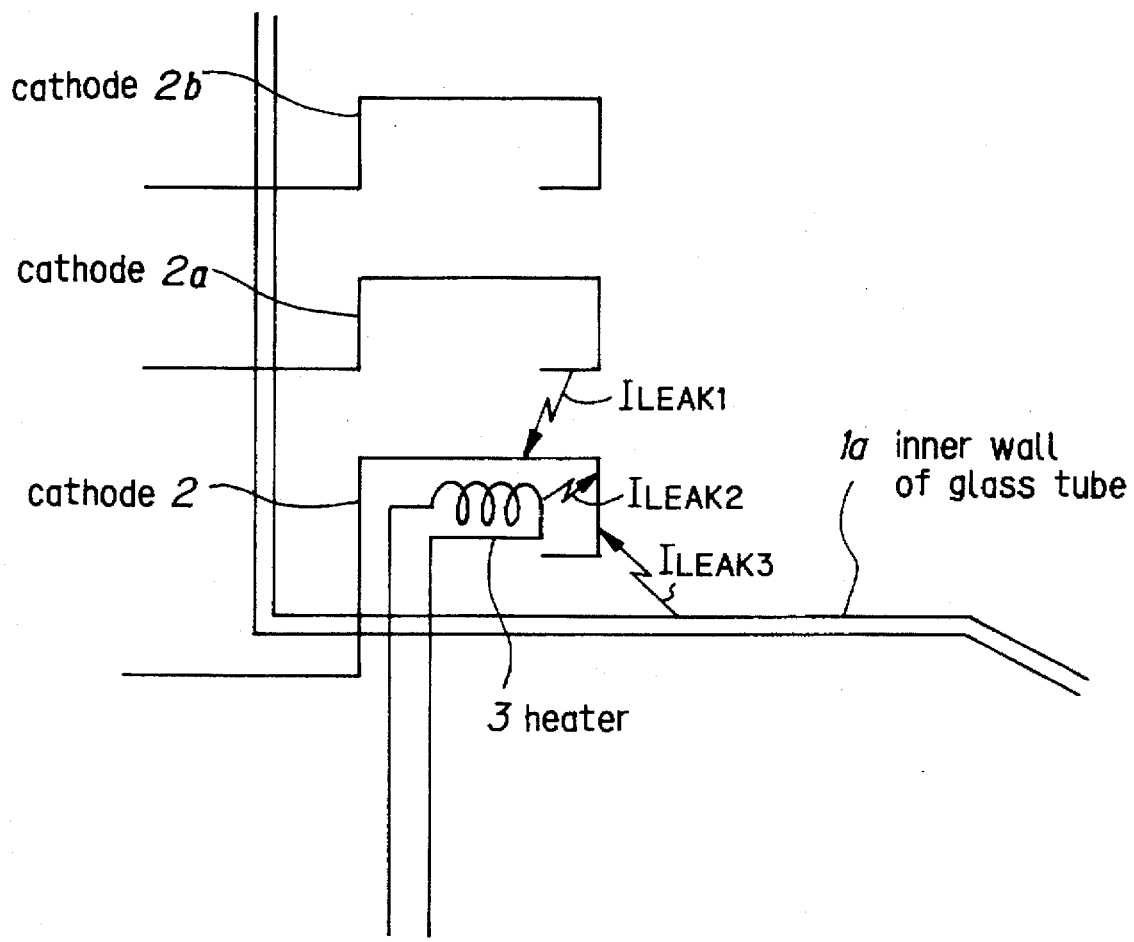
FIG. 5 schematically illustrates the cathode 2 and the peripheral portion of FIG. 4 in an enlarged form.

Referring now to FIG. 5 and FIG. 6, operations of the cathode current detecting circuit according to the embodiment, shown in FIG. 4, will be described. FIG. 5 is an enlarged diagram for showing a peripheral portion of the cathode 2 of FIG. 4. As previously explained, since three cathodes are employed, a cathode 2a and a cathode 2b other than the cathode 2 are arranged. In the case that the cathode current $I_K$ is detected to control the white balance, as shown in this drawing, the current flowing through the cathode 2 actually contains various leak currents. In this embodiment, it is assumed that a leak current "$I_{LEAK1}$" derived from the cathode 2a, a leak current "$I_{LEAK2}$" derived from the heater 3 for heating the cathode 2, and a leak current "$I_{LEAK3}$" derived from an inner wall 1a of a glass tube of the CRT1 are contained in the current flowing through the cathode 2. In other words, the leak current "$I_{LEAK}$" flowing through the cathode 2 is defined as follows:

$$I_{LEAK}=I_{LEAK1}+I_{LEAK2}+I_{LEAK3}$$

As already explained in the prior art, since the amplitude of the above-described leak current $I_{LEAK}$ is varied in accordance with an elapse of time, when the current flowing through the cathode 2 is the cathode current to be detected and the white balance is controlled based upon this detected cathode current, the normal luminance cannot be maintained so as to stabilize the white balance if the leak current $I_{LEAK}$ is changed.

Therefore, in addition to the highlight detection pulse and the cutoff detection pulse, as previously described in the prior art, a leak current detection pulse is applied to the base of the PNP transistor 12 at a preselected timing As previously explained, these three sorts of detection pulses are outputted from the signal output circuit 15.

Since a current "$I_{BIAS}$" (that will be discussed later) is supplied via the resistor 11 to the PNP transistor 12, a voltage $V_B$ is being applied to the resistor 11. As a consequence, a current flowing through the resistor 13 is given as follows:

$$I_{13} = \text{cathode current } I_K + \text{leak current } I_{LEAK} + I_{BIAS}.$$

FIG. 6 is a timing chart for representing a relationship of the current flowing through the resistor 13 at an input timing of a pulse applied to the base of the PNP transistor 12. It should be understood that explanations about the cutoff detection pulse and the highlight detection pulse are similar to those of the conventional cathode current detecting circuit.

When the scanning line is positioned at the detection portion 101 shown in FIG. 2, and also at a preselected timing within a period during which neither the cutoff detection pulse, nor the highlight detection pulse (shown in FIG. 6B) is applied to the base of the PNP transistor 12, namely a blanking period W indicated in FIG. 6A, the control signal having a predetermined control pulse is applied from the control pulse generating circuit 30 to the grids 4 and 5 in such a manner that the election beam emitted from the cathode 2 does not impinge on the anode 6.

During this blanking period W, the leak current detection pulse having the same amplitude as that of the cutoff detection pulse is applied to the base of the PNP transistor 12 (see FIG. 6B). This may cause the potential relationship between the cathode 2 and the electrode adjacent to the cathode 2 to be similar to that when the cutoff is detected within this blanking period W, whereby the leak current $I_{LEAK}$ may be detected.

The above-explained current $I_{BIAS}$ will now be described. Assuming now that a maximum value of the leak current $I_{LEAK}$ is "$I_{LEAK-MAX}$", this current $I_{BIAS}$ is set by the following formula:

$$I_{LEAK-MAX} \leq I_{BIAS}$$

Since the current $I_{BIAS}$ is set in accordance with the above-described formula, even when the cathode current $I_K = 0$, the value of the current flowing through the resistor 13 can always become a positive value. This condition is indicated in FIG. 6C and FIG. 6D. That is, FIG. 6C represents such a case that the leak current $I_{LEAK}$ has a positive value, whereas FIG. 6D indicates such a case that the leak current $I_{LEAK}$ has a negative value. In any case, it may be understood that the value of this leak current does not become negative by applying the current $I_{BIAS}$ to the PNP transistor 12.

A terminal voltage (leak current detection voltage) across the resistor 13 is input to the clamping circuit 20. As represented in FIG. 6E, a clamping pulse is entered into the clamping circuit 20 in this blanking period W. Upon receipt of this clamping pulse, the clamping circuit 20 clamps the leak current detection voltage corresponding to the leak current $I_{LEAK}$ flowing through the resistor 13, which is entered into the clamping circuit 20, to 0 (zero) V.

Accordingly, the voltage (cathode current detection voltage) output from the buffer 14 at the generation timing of either the highlight detection pulse, or the cutoff detection pulse, contains no leak current detection component, since the value of the above-described leak current detection voltage is clamped to 0 V. Therefore, $V_C$ and $V_H$ indicated in FIG. 6F become correct cathode current detection voltages.

As a result, the connect cathode current can be detected from the buffer output of the buffer 14, so that the white balance can be correctly controlled.

As previously described in detail, in accordance with the cathode current detecting method and the cathode current detecting circuit, of the present invention, since the leak current flowing through the cathode is detected and this leak current is clamped, the cathode current can be correctly detected.

What is claimed is:

1. A cathode current detecting method for a cathode ray tube wherein both a highlight detection pulse used to detect a white component and a cutoff detection pulse used to detect a black component are fed to a signal input unit, and a cathode current is detected corresponding to one of said highlight detection pulse and said cutoff detection pulse, comprising the steps of:

producing a leak current detection pulse having the same magnitude as a magnitude of said cutoff detection pulse at a preselected timing;

prohibiting an electron beam emitted from said cathode from flowing through an anode of the cathode ray tube at said preselected timing;

detecting the leak current flowing through said cathode in response to said leak current detection pulse at said preselected timing; and clamping a voltage corresponding to said leak current to a predetermined reference potential.

2. A cathode current detecting method as claimed in claim 1 wherein the step of producing a leak current detection pulse includes selecting said preselected timing to correspond to a period during which said electron beam is scanned at a location outside of an effective display screen area of the cathode ray tube.

3. A cathode current detecting method as claimed in claim 1 or 2, further comprising the step of:

supplying a bias current having a predetermined magnitude to a current path through which one of said cathode current and said leak current flows.

4. A cathode current detecting circuit for a cathode ray tube wherein both a highlight detection pulse used to detect a white component and a cutoff detecting pulse used to detect a black component are fed to a signal input unit, and a cathode current flowing from a cathode to an anode is based upon one of said highlight detection pulse and said cutoff detection pulse, comprising:

signal output means for producing a leak current detection pulse having the same magnitude pulse as a magnitude of said cutoff detection pulse at a preselected timing;

prohibiting means for prohibiting said electron beam emitted from said cathode from flowing at said preselected timing;

prohibit signal outputting means for producing a signal to cause said prohibiting means to perform a prohibit operation in response to the output from said signal output means at said preselected timing; and clamping means for detecting a leak current flowing through said cathode in response to said leak current detection pulse at said preselected timing for clamping a voltage corresponding to said leak current to a predetermined reference potential.

5. A cathode current detecting circuit as claimed in claim 4 wherein:

said preselected timing corresponds to a period during which said electron beam is scanned at an outside of an effective display screen.

6. A cathode current detecting circuit as claimed in claim 4 or 5, further comprising:

means for supplying a bias current having a predetermined magnitude to a current path through which one of said cathode current and said leak current flows.

* * * * *